Nov. 28, 1950 N. P. HOLCOMB ET AL 2,531,938
LIQUID DISPENSING MACHINE
Filed Jan. 11, 1947
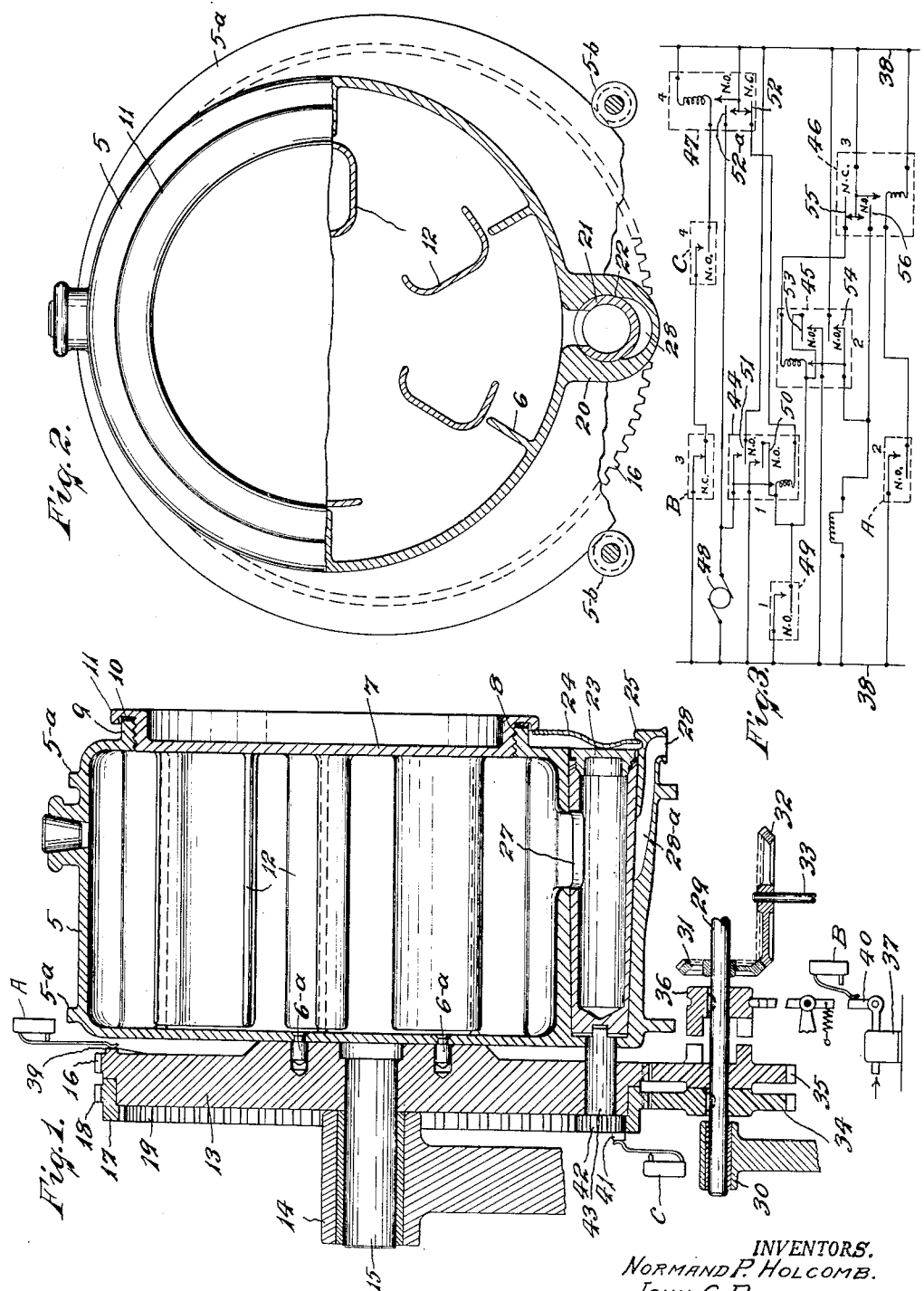
INVENTORS.
NORMAND P. HOLCOMB.
BY JOHN C. ROTHWELL.
Louis V. Lucia
ATTORNEY.

Patented Nov. 28, 1950

2,531,938

UNITED STATES PATENT OFFICE 2,531,938

LIQUID DISPENSING MACHINE

Normand P. Holcomb, Warehouse Point, and John C. Rothweil, Rockville, Conn., assignors of one-third to Edwin H. De Frees, Wethersfield, Conn.

Application January 11, 1947, Serial No. 721,496

9 Claims. (Cl. 259—30)

This invention relates to liquid dispensing machines and more particularly to an apparatus for dispensing milk.

It is well known that in the dispensing of milk, it is necessary to mix the milk with the cream content in order that it may be evenly dispensed to avoid separation of the cream from the milk.

It is also necessary that such apparatus must permit sanitation in the dispensing of the milk, and this requires easy accessibility to the interior of the milk container for cleaning and sterilizing.

An object of this invention, therefore, is to provide an apparatus for dispensing milk having novel advantages permitting the dispensing of milk, or the like, in a sanitary manner and which will thoroughly mix the milk with the cream therein before it is dispensed.

A further object of this invention is to provide such an apparatus which may be used in connection with vending mechanism wherein milk-dispensing operations of said apparatus are controlled by the deposit of a required coin.

Further objects and advantages of this invention will be more clearly understood from the following description and from the accompanying drawings in which:

Fig. 1 is a side view, in central vertical section, through a liquid dispensing apparatus embodying our invention.

Fig. 2 is a front view, partly in section, of the liquid container used in said apparatus.

Fig. 3 is a diagrammatic view of an electric circuit for controlling the mechanism of said apparatus.

As illustrated in the drawings, the numeral 5 denotes a container, preferably in the shape of a circular drum having a series of ribs 6 spaced along the inner wall thereof. A cover 7 is secured to said drum in any suitable manner, such as by threading the same, as at 8, to an annular flange 9 on the front of said container. The said flange may abut a suitable seal 10 between a flange 11 on said cover and the edge of the said flange 9.

The cover 7 is provided with a series of vanes 12 which extend inwardly into the container 5 as clearly illustrated in Fig. 1. These vanes cooperate with the ribs 6 in agitating the liquid, such as milk, for thorough mixing thereof upon the said container being rotated.

As illustrated in Fig. 1, the container 5 is connected to a gear disk 13 which is rotatably mounted in a bearing 14 by means of a shaft 15 projecting rearwardly from said disk. In the preferred form illustrated, the container drum 5 is provided with annular flanges 5-a—5-a by means of which it is rotatably supported upon suitable rollers 5-b—5-b. The said drum is rotated by means of drive posts 6-a—6-a which are detachably connected with the gear disk 13 by fitting into recesses therein.

The outer periphery of the said disk 13 is provided with gear teeth 16 and a ring 17 is rotatably mounted on said disk 13 and has an outer row of gear teeth 18 and an inner row of teeth 19 for the purpose to be hereinafter described.

At the bottom of the container 5, there is provided a valve housing portion 20 within which is rotatably mounted a measuring valve preferably comprising a cylindrical hollow plug 21 having a slightly tapered exterior adapted to fit a tapered recess 22 in the housing portion 20. A cap 23 is preferably threaded to the end of the cylindrical plug 21 as shown and in such a manner that it may be easily detached therefrom when it is desired to clean the interior of the measuring valve. A spring 24, preferably of the form shown in Fig. 1, is positioned between an abutment 25 on the said housing and the under side of the flange 11 for pressing the measuring valve plug inwardly in sealing engagement with the inner wall of the recess which communicates with the interior of the container, through a passage 27, and with a spout 28 through a passage 28a.

Means for operating the above-described mechanism may comprise a driving shaft 29 which is rotatably mounted in a bearing 30 and driven by gears such as bevel gears 31 and 32 which may be rotated by means of a suitable electric motor connected to the drive shaft 33.

The said shaft 29 carries therewith a gear 34, which meshes with the teeth 18 of the ring gear 17, and a separate gear 35 which is rotatably carried on the shaft 29 and engageable with a suitable clutch member 36 that is slidably keyed to said shaft for connecting the gear 35 thereto when the said clutch member 36 is operated by a suitable device, such as a solenoid 37.

As illustrated in Fig. 3, a means for controlling our improved dispensing apparatus may comprise an electric circuit including a pair of current supply conductors 38—38 between which are connected a series of electric switches that are operated by different units of the dispensing apparatus in order to control the operations of said units.

As shown, the switch A in said circuit is operated by means of a detent 39 on the gear disk 13, the switch B is operated by the clutch lever 40, and the switch C is operated by a detent 41 on a gear 42 which rotates a shaft 43 that operates the dispensing valve 21.

In addition to the said switches, there is included within the circuit a series of relays 44, 45, 46, and 47, a motor 48 for rotating the drive shaft 29, and a main control switch 49 which may be either manually or coin controlled.

When the main switch 49 is coin controlled, such as by any suitable mechanism requiring the insertion of a coin for the operation thereof, our improved apparatus may be used as a vending machine. The said apparatus, or the mixing container alone, may be enclosed within a refrigerated cabinet of any suitable type when it is desired to dispense milk or the like in order to prevent the spoilage thereof. In such machines, a measured amount of liquid is usually placed in a cup that is positioned underneath the spout 28. If desired the cups may be automatically placed under the spout, filled and delivered to the user upon the insertion of a coin in the mechanism which will operate to close the switch 49 and cause operation of our dispensing apparatus.

The operation of the above-described embodiment of our invention is as follows:

When the switch 49 is closed, either by the operation of a coin-controlled mechanism (not shown) or by manual operation, the electric current will energize the relay 44 and close the two normally-open switches 50 and 51 thereof. The current will then pass through conductor 38 through the switch 49, the coil of the relay 44 and the normally-closed switch 52 in the relay 47; thus the coil of the relay 44 has become self-energized by momentary contact in the switch 49, which switch can immediately open without effecting the further operation of the mechanism for completing a dispensing cycle. This is preferred where it is desired that the switch 49 be operative to set the mechanism in motion by a momentary contact as in cases where the said mechanism is released upon the passage of the coin therethrough.

As the switch 51 is closed upon energization of the coil in the relay 44, the circuit will be closed through the motor indicated at 48 which will immediately start the operation of the mechanism by rotating the shaft 33 and through the gears 32 and 31 rotate the shaft 29.

The momentary operation of the switch 49 will also cause closing of the normally open switches 53 and 54 in the relay 45 by energizing the coil of said relay through the normally closed switch 55 of the relay 46. This will cause energization of the solenoid 37 which will operate the clutch lever 40 and move the member 36 to lock the gear 35 to the shaft 29, while the said lever will cause the switch B to open. The rotation of the gears 34 and 35 by the shaft 29 will rotate the disk gear 13 and the ring gear 17, thus rotating the container 5 upon the rollers 5-b—5-b with the measuring valve 21 moving with said container but inoperative.

As the disk 33 begins to rotate, the boss 39 will move away from the operating arm of the normally open switch A and permit said switch to close. This will cause energization of the coil in the relay 46 to close the normally open switch 56 and open the normally closed switch 55.

Opening of the switch 55 will cause de-energization of the coil in the relay 45 and break the circuit to the solenoid 37 through the switch 54, while closing of the switch 56 will maintain the solenoid 37 energized for continuance of the operating cycle of the machine.

Rotation of the gears 17 and 13 with the drum 7 will now continue until said drum has revolved for one complete turn. At this time the boss 39 will again engage the lever of the switch A to open said switch and break the circuit through the coil of the relay 46 and thus de-energizing said coil and permitting opening of the switch 56 to deenergize the solenoid 37 and permit the clutch 36 to be operated so as to release the gear 35 from the drive shaft and thus cause the drum 7 to come to a stationary position. Disengagement of the clutch 36 will cause return of the switch B to its normally closed position. As soon as the drum has reached the stationary position, the boss 41 on the gear 42 of the stud 43 will engage the lever of the normally open switch C and close said switch to energize the coil of the relay 47 and close the circuit to the motor 48 directly through the two-way switch 52-a so as to retain said motor in operation until the stud 43 has rotated the valve plug 21 in complete rotation when the stud 41 will again engage the switch C and return it to its normally open position whereupon the circuit through the coil of the relay 47 will be broken and the said relay is returned to its normal position breaking the circuit through the motor and completing the cycle of operation.

From the above it will be clearly understood that the deposit of a coin in a coin-operated mechanism for operating the switch 49, or the manual operation of said switch, will immediately initiate the operation of the device to rotate the drum 7. As soon as the said drum has started its rotation, the relays in the circuit above-described will operate to permit said drum to make one complete rotation and come to a standstill, and then permit one complete rotation of the valve plug 21 to dispense a measured amount of liquid, such as milk, through the spout 28; whereupon the cycle of operation will have been completed.

It is also to be understood that operation of the clutch member 36 by the solenoid 37 will, in effect, connect the gear 35 to operate with the gear 34 so that the ring gears 13 and 17 will rotate together until the rotation of the drum 7 has been completed. The said clutch will then disengage the gear 35 and permit only rotation of the gear 34 to rotate the gear 17 further until the gear 42 of the shaft 43 has been rotated one complete turn and the valve operated for the dispensing of the liquid.

It is desired to have it understood that, while applicants prefer the use of an electric circuit as above-described for controlling the operation of the device, other means, such as mechanically controlled means, may be used without departing from scope of the invention as set forth in the following claims.

We claim:

1. A liquid dispensing machine of the character described comprising a drum rotatably mounted on a horizontal axis, a first gear secured to said drum for rotating it on said axis, a measuring valve having a measuring plug rotatable on said drum, a second gear for rotating said valve member, means for driving both of said gears to rotate the drum and the valve member therewith in inoperative position, and means operable upon the completion of rotation of said drum to cause discontinuance of rotation of the said first gear and thereby allowing independent rotation of the second gear for rotating the measuring plug independently of said drum.

2. A liquid dispensing machine of the character described comprising a container in the form of a drum rotatable about a horizontal axis, a first gear secured to said drum for rotating the same, a valve having a measuring member rotatable in said drum, a second gear for rotating said valve member to cause a liquid dispensing operation thereby, means for driving said drum rotating gear and the second gear together to cause rotation of the drum with the said valve member carried thereby inoperative, and clutch means operable upon the completion of a revolution by said drum to cause termination of the rotation of said drum and permit continuance of the rotation of the second gear independently of the first gear for causing rotation of the valve member to dispense a measured amount of liquid from said drum.

3. A liquid dispensing machine of the character described comprising a drum rotatable on a horizontal axis, a first gear rotatable on said axis and connected to said drum for rotating the same, a dispensing valve in said drum having a rotatable plug, a second gear also rotatable on said axis and with the first gear, a shaft rotatably mounted in the first gear and connected with said plug for rotating the same, a pinion on said shaft in mesh with the second gear, a driving shaft having a driving gear keyed thereon for driving the said second gear, a driving gear rotatable on said driving shaft for driving the first gear, a clutch for connecting the rotatable driving gear to said shaft, means for operating said clutch to connect said rotatable driving gear to the shaft and thereby cause rotation of the first gear with the second gear for rotating the drum and permitting said valve member to remain inoperative during the rotation of the drum, and means operable upon completion of a revolution of said drum to cause said clutch to disconnect the rotatable driving gear from the driving shaft and permit continuance of rotation of the second gear independently of the first gear for rotating the valve plug to dispense a measured amount of liquid.

4. A liquid dispensing machine of the character described comprising a drum having a circular wall, a projection depending from said wall, a measuring valve including a hollow plug rotatable in said projection, supporting rollers for carrying said drum, a mechanism including a first rotating gear rotatable on a horizontal axis, co-operating means on said gear and drum for permitting rotation of the drum by said gear, means carried by said gear and projecting therefrom to engage and rotate said plug member, a second gear rotatable on said axis for causing rotation of said plug member, and means for driving said first and second gears; the said driving means including a driving shaft, a driving gear rotatable on said shaft and in mesh with the first gear, a separate driving gear keyed to said shaft and in mesh with the second gear, clutch means for temporarily securing said rotatable driving gear to the shaft to cause rotation of the first gear with the second gear for rotating the said drum and permitting the valve to remain stationary relatively to the drum, a solenoid for operating said clutch, and an electric switch, operable upon the completion of a revolution by said drum, to break an electric circuit through said solenoid and cause operation of said clutch to disengage the rotatable driving gear from the driving shaft and thereby terminate the rotation of the first gear and the drum and permit operation of the said measuring valve by continued rotation of the second gear.

5. A liquid dispensing mechanism of the character described comprising a drum for containing liquid, a valve carried by said drum and having a rotatable measuring member for dispensing a measured amount of liquid from said drum, a spout on said drum communicating with said member, a gear rotatable on a horizontal axis, means for rotatably carrying said drum, a detachable connection between said drum and rotating gear, a shaft rotatable in the rotating gear for rotating said plug member, a separate gear rotatable with the rotating gear, means for driving the rotating and separate gears together to cause the valve member to be carried with the drum in relatively stationary condition, and means operable upon the said drum reaching a predetermined position to terminate the rotation of said drum and permit the independent rotation of said separate gear and thereby cause rotation of said measuring member relatively to the drum for dispensing liquid therefrom through said spout.

6. A liquid dispensing device of the character described comprising a drum for containing liquid, a cover on said drum having projections extending into the drum for agitating the liquid upon rotation of the drum, a flange on said cover, a measuring valve in said drum, a measuring plug for said valve rotatable in a tapered recess in said drum, an abutment on said drum, a spring member secured between said abutment and the flange of said cover for resiliently retaining said rotatable member seated within the tapered recess, a spout for dispensing liquid from said rotatable member, means for rotating said drum to mix liquid therein, and means for rotating said valve member to dispense liquid from the drum through said spout while the drum is stationary.

7. In a liquid dispensing apparatus of the character described the combination of a container rotatable on a horizontal axis, a valve including a rotatable measuring plug carried by said container, a spout for dispensing liquid from said plug, a first gear for rotating said container for a liquid mixing operation, a shaft rotatable in said rotating gear for rotating said measuring plug, a pinion for rotating said shaft, a second gear rotatable in mesh with said pinion, a driving shaft, a driving gear keyed to said driving shaft and in mesh with the second gear, a driving gear rotatable on said shaft and meshing with the first gear, a clutch including a member keyed to said driving shaft and engageable with said rotatable driving gear to cause rotation of the first gear with the second gear for rotating the drum without causing rotation of the measuring plug relatively to the drum and for disengaging said rotatable driving gear from the driving shaft to discontinue rotation of the drum and permit continued rotation of the second gear to operate the measuring plug, and electric means for controlling the operation of said device; said electric means comprising an electric circuit including therein a motor for driving said driving shaft, a solenoid for operating said clutch, a first relay, a normally open first switch for causing operation of said first relay for energization of said motor to drive the driving shaft, a second relay operable by said first switch for causing energization of said solenoid to cause the clutch to lock the rotatable driving gear to the said driving shaft for rotation of the drum and the valve therewith in inoperative condition, a third relay, a second switch operable upon starting movement of said mechanism for causing operation of the third relay to break the circuit through the second relay and retain the solenoid in energized condition for permitting the rotation of said drum for a revolution; the said second switch being operable upon the completion of said revolution to cause operation of the third relay for de-energizing said solenoid and thereby causing operation of the clutch for disengaging the rotatable driving gear from the rotatable shaft to terminate the rotation of said drum and thereby causing rotation of the pinion for operation of the measuring valve through continued rotation of the second gear, a fourth relay, a third switch in series with said fourth relay and operable to closed position upon a disengaging operation of the clutch, and a fourth switch in series with the third switch and fourth relay and operable to closed position upon starting of rotation of said pinion to cause operation of the fourth relay for continuing the operation of the motor and movable to open position upon completion of a revolution by said pinion to break the circuit to said fourth relay and thereby terminate the operation of said motor and the cycle of operation of said device to cause operation of the second relay for continuing the operation of the motor and movable to open position upon completion of a revolution by said pinion to break the circuit to said second relay and thereby terminate the operation of said motor and terminate the cycle of operation of said device.

8. A liquid dispensing machine comprising a container in the form of a rotatably mounted drum, a member rotatably mounted relatively to said drum, a dispensing valve rotatably mounted in said drum and engaging said member, means for simultaneously rotating said member and drum with the valve inoperative therein, and means for causing rotation of said member independently of said drum to thereby cause rotation of said valve relatively to said drum for dispensing liquid upon the said drum reaching a predetermined position.

9. A liquid dispensing device comprising a liquid container in the form of a drum rotatably mounted upon a horizontal axis, a member rotatably mounted on said axis relatively to the drum, a measuring valve carried in the drum and projecting therefrom into operative engagement with said member, driving means for simultaneously rotating said drum and member with the said measuring valve in inoperative position during rotation of the drum, means to terminate the rotation of said drum and permit the said member to continue to rotate and thereby cause operation of said measuring valve for dispensing liquid from the drum, an electric circuit for controlling the operation of the drum and member; said circuit including a main switch, a motor for rotating said drum and member, and a series of relays and switches operable upon the completion of rotation of said drum for controlling the operation of the said member.

NORMAND P. HOLCOMB.
JOHN C. ROTHWELL.

REFERENCES CITED

The following references are of record in the file of this patent:

UNITED STATES PATENTS

| Number | Name | Date |
|---|---|---|
| 481,564 | Huggins | Aug. 30, 1892 |
| 1,105,812 | McKaig | Aug. 4, 1914 |
| 2,239,984 | Barreda | Apr. 29, 1941 |